US010550351B2

(12) United States Patent
Takahashi et al.

(10) Patent No.: US 10,550,351 B2
(45) Date of Patent: Feb. 4, 2020

(54) REFRIGERATOR OIL AND REFRIGERATOR WORKING FLUID COMPOSITION

(71) Applicants: JX NIPPON OIL & ENERGY CORPORATION, Tokyo (JP); AGC INC., Tokyo (JP)

(72) Inventors: Hitoshi Takahashi, Tokyo (JP); Tsutomu Takahashi, Tokyo (JP); Akira Tada, Tokyo (JP); Souichirou Konno, Tokyo (JP)

(73) Assignees: JX NIPPON OIL & ENERGY CORPORATION, Tokyo (JP); AGC INC., Tokyo (JP)

( * ) Notice: Subject to any disclaimer, the term of this patent is extended or adjusted under 35 U.S.C. 154(b) by 0 days.

(21) Appl. No.: 15/124,486

(22) PCT Filed: Feb. 27, 2015

(86) PCT No.: PCT/JP2015/055926
§ 371 (c)(1),
(2) Date: Sep. 8, 2016

(87) PCT Pub. No.: WO2015/137166
PCT Pub. Date: Sep. 17, 2015

(65) Prior Publication Data
US 2017/0015935 A1 Jan. 19, 2017

(30) Foreign Application Priority Data
Mar. 14, 2014 (JP) .................................. 2014-052287

(51) Int. Cl.
C09K 5/04 (2006.01)
C10M 171/00 (2006.01)
C10M 105/38 (2006.01)

(52) U.S. Cl.
CPC ......... *C10M 171/008* (2013.01); *C09K 5/045* (2013.01); *C10M 105/38* (2013.01); *C09K 2205/126* (2013.01); *C10M 2207/2835* (2013.01); *C10N 2220/302* (2013.01); *C10N 2240/30* (2013.01)

(58) Field of Classification Search
CPC .............. C09K 2205/126; C09K 5/045; C09K 2205/22; C09K 2205/24; C10M 2207/283; C10M 2207/2835
See application file for complete search history.

(56) References Cited

U.S. PATENT DOCUMENTS

| 9,212,303 B2 | 12/2015 | Matsumoto |
| 9,353,303 B2 | 5/2016 | Fukushima |
| 10,047,315 B2* | 8/2018 | Takahashi ............ C10M 105/38 |
| 2013/0012420 A1* | 1/2013 | Matsumoto ............ C09K 5/045 508/569 |
| 2014/0070132 A1 | 3/2014 | Fukushima |
| 2014/0374647 A1* | 12/2014 | Saito ...................... C09K 5/042 252/68 |
| 2015/0008358 A1 | 1/2015 | Okido et al. |
| 2015/0041705 A1 | 2/2015 | Saito et al. |
| 2015/0252281 A1 | 9/2015 | Saito et al. |

FOREIGN PATENT DOCUMENTS

| CN | 101568625 A | 10/2009 |
| CN | 102191113 A | 9/2011 |
| CN | 102191114 A | 9/2011 |
| CN | 102791840 A | 11/2012 |
| CN | 103108944 A | 5/2013 |
| CN | 103534328 A | 1/2014 |
| JP | 2011-246587 | 12/2011 |
| WO | 2011/118733 A1 | 9/2011 |
| WO | 2012/157764 A1 | 11/2012 |
| WO | WO 2013/100100 * | 4/2013 |
| WO | 2013/062058 A | 5/2013 |
| WO | 2013/147045 A | 10/2013 |
| WO | 2014/034568 A1 | 3/2014 |

OTHER PUBLICATIONS

International Search Report issued with respect to Application No. PCT/JP2015/055926, dated May 19, 2015.
International Preliminary Report on Patentability issued with respect to Application No. PCT/JP2015/055926, dated Sep. 14, 2016.
European Search Report in respect to European Application No. 15760719.3, dated Jul. 14, 2017.
Chinese Office Action from Application No. 201580013876.2, dated Jan. 2, 2019.
Office Action issued in Counterpart Japanese Application No. P2017-238736 dated May 21, 2019.
Chinese Office Action from Application No. 201580013876.2 including (X) and (A) designation for cited references, dated May 3, 2018.

* cited by examiner

*Primary Examiner* — John R Hardee
(74) *Attorney, Agent, or Firm* — Greenblum & Bernstein, P.L.C.

(57) ABSTRACT

The present invention provides a refrigerating machine oil comprising at least one oxygen-containing oil having a carbon/oxygen molar ratio of 2.5 or more and 5.8 or less as a base oil, and the refrigerating machine oil being used with a trifluoroethylene refrigerant.

11 Claims, No Drawings

REFRIGERATOR OIL AND REFRIGERATOR WORKING FLUID COMPOSITION

TECHNICAL FIELD

The present invention relates to a refrigerating machine oil and a working fluid composition for a refrigerating machine.

BACKGROUND ART

Against the background of the recent problem of ozone layer depletion, CFC (chlorofluorocarbon) and HCFC (hydrochloro-fluorocarbon) conventionally used as refrigerants for refrigerating machines are subject to regulation and, instead of them, HFC (hydrofluorocarbon) is becoming widely used as a refrigerant. However, one of the HFC refrigerants, HFC-134a, which is commonly used as a refrigerant for car air conditioners, is subject to regulation in Europe due to its high global warming potential (GWP) although its ozone-depleting potential (ODP) is zero.

Under such circumstances, there have been an urgent need to develop a refrigerant that has a small influence on the ozone layer and has a low GWP. For example, Patent Literature 1 discloses a trifluoroethylene (HFO-1123) refrigerant as a refrigerant that has a small influence on the ozone layer and has a low GWP.

In the conventional case where CFC or HCFC is used as a refrigerant, a refrigerating machine oil containing a mineral oil or a hydrocarbon oil such as alkylbenzene has been suitably used. Depending on the type of the coexisting refrigerant, a refrigerating machine oil may show unexpected behaviors in terms of its compatibility with the refrigerant, its lubricating properties, the viscosity of its solution in the refrigerant, or its thermal and chemical stability, which is why different refrigerating machine oils need to be developed for different refrigerants.

CITATION LIST

Patent Literature

Patent Literature 1: International Publication No. WO 2012/157764

SUMMARY OF INVENTION

Technical Problem

The object of the present invention is to provide a refrigerating machine oil superior in conformity with trifluoroethylene (HFO-1123) refrigerants and a working fluid composition for a refrigerating machine comprising the refrigerating machine oil.

Solution to Problem

The present invention provides a refrigerating machine oil comprising at least one oxygen-containing oil having a carbon/oxygen molar ratio of 2.5 or more and 5.8 or less as a base oil, the refrigerating machine oil being used with a trifluoroethylene refrigerant.

The present invention also provides a working fluid composition for a refrigerating machine comprising: a refrigerating machine oil comprising at least one oxygen-containing oil having a carbon/oxygen molar ratio of 2.5 or more and 5.8 or less as a base oil; and a trifluoroethylene refrigerant.

It is preferable for the above refrigerating machine oil to comprise an ester of a fatty acid and a polyhydric alcohol as the oxygen-containing oil, the fatty acid comprising a branched fatty acid having 4 to 9 carbon atoms in a proportion of 20 to 100 mol %.

Advantageous Effects of Invention

The present invention can provide a refrigerating machine oil superior in conformity with trifluoroethylene (HFO-1123) refrigerants and a working fluid composition for a refrigerating machine comprising the refrigerating machine oil.

DESCRIPTION OF EMBODIMENTS

Hereinafter, preferred embodiments of the present invention will be described in detail.

A refrigerating machine oil according to the present embodiment comprises at least one oxygen-containing oil having a carbon/oxygen molar ratio of 2.5 or more and 5.8 or less as a base oil and is used with a trifluoroethylene refrigerant.

A working fluid composition for a refrigerating machine according to the present embodiment comprises: a refrigerating machine oil comprising at least one oxygen-containing oil having a carbon/oxygen molar ratio of 2.5 or more and 5.8 or less as a base oil; and a trifluoroethylene refrigerant. The working fluid composition for a refrigerating machine according to the present embodiment encompasses embodiments in which the composition comprises the refrigerating machine oil according to the present embodiment and a trifluoroethylene refrigerant.

The base oil is at least one oxygen-containing oil having a carbon/oxygen molar ratio of 2.5 or more and 5.8 or less. The carbon/oxygen molar ratio of such an oxygen-containing oil is preferably 3.2 or more, more preferably 4.0 or more and is preferably 5.0 or less, in terms of the compatibility with refrigerants and of the stability. The carbon/oxygen molar ratio can be quantitatively analyzed by a common elemental analysis method. One example of the method for analyzing carbon is a method in which the analysis is conducted by a thermal conductivity technique or gas chromatography after conversion to carbon dioxide by burning. Carbon reduction process, in which quantitative analysis is conducted after oxygen is converted to carbon monoxide using carbon, is typical as the method for analyzing oxygen, and Shutze-Unterzaucher method has been widely used in practice.

Examples of the oxygen-containing oil include esters, polyvinyl ethers, polyalkylene glycol carbonates, ketones, polyphenyl ethers, silicones, polysiloxanes, and perfluoroethers, among which an ester, a polyvinyl ether, or a polyalkylene glycol is preferred and an ester is more preferred.

Examples of the ester include an aromatic ester, a dibasic acid ester, a polyol ester, a complex ester, a carbonic acid ester, and mixtures thereof, and a polyol ester is preferred.

As the aromatic ester there is used, for example, an ester of an aromatic carboxylic acid having 1 to 6, preferably 1 to 4, more preferably 1 to 3 carboxyl groups and an aliphatic alcohol having 1 to 18, preferably 1 to 12 carbon atoms. Specific examples of the aromatic carboxylic acid having 1 to 6 carboxylic groups include benzoic acid, phthalic acid, isophthalic acid, terephthalic acid, trimellitic acid, pyromellitic acid, and mixtures thereof. Specific examples of the aliphatic alcohol having 1 to 18 carbon atoms include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, and mixtures thereof. These aliphatic alcohols having 1 to 18 carbon atoms may be linear or branched. An aromatic carboxylic acid having two or more carboxyl groups may be a simple ester formed of an alcohol consisting of one aliphatic alcohol or may be a complex ester formed of an alcohol consisting of two or more aliphatic alcohols.

As the dibasic acid ester there are preferably used: esters of dibasic acids having 5 to 10 carbon atoms, such as glutaric acid, adipic acid, pimelic acid, suberic acid, azelaic acid, and sebacic acid, and monohydric alcohols having 1 to 15 carbon atoms and having a linear or branched alkyl group, such as methanol, ethanol, propanol, butanol, pentanol, hexanol, heptanol, octanol, nonanol, decanol, undecanol, dodecanol, tridecanol, tetradecanol, and pentadecanol; and mixtures of these esters.

The polyol ester is an ester synthesized from a polyhydric alcohol and a fatty acid. As the fatty acid there is preferably used a saturated fatty acid. It is preferable that the number of carbon atoms in the fatty acid be 4 to 9, more preferably 5 to 9. The polyol ester may be a partial ester in which some of the hydroxyl groups of the polyhydric alcohol remain as hydroxyl groups without being esterified, may be a complete ester in which all of the hydroxyl groups have been esterified, or may be a mixture of the partial ester and the complete ester. The hydroxyl value of the polyol ester is preferably 10 mgKOH/g or less, more preferably 5 mgKOH/g or less, and even more preferably 3 mgKOH/g or less.

It is preferable that the proportion of a branched fatty acid in the fatty acid for forming the polyol ester be 20 to 100 mol %, more preferably 50 to 100 mol %, even more preferably 70 to 100 mol %, particularly preferably 90 to 100 mol %. In particular, it is preferable that the proportion of a branched fatty acid having 4 to 9 carbon atoms be within the above range.

Specific examples of the branched fatty acid having 4 to 9 carbon atoms include branched butanoic acid, branched pentanoic acid, branched hexanoic acid, branched heptanoic acid, branched octanoic acid, and branched nonanoic acid. More specifically, preferred are fatty acids branched at the $\alpha$, position and/or the $\beta$ position, preferred examples of which include isobutanoic acid, 2-methylbutanoic acid, 2-methylpentanoic acid, 2-methylhexanoic acid, 2-ethylpentanoic acid, 2-methylheptanoic acid, 2-ethylhexanoic acid, and 3,5,5-trimethylhexanoic acid, among which 2-ethylhexanoic acid and/or 3,5,5-trimethylhexanoic acid is more preferred.

The fatty acid may comprise a fatty acid other than the branched fatty acid having 4 to 9 carbon atoms. As the fatty acid other than the branched fatty acid having 4 to 9 carbon atoms there is preferably used, for example, a linear fatty acid having 4 to 9 carbon atoms (that is, n-butanoic acid, n-pentanoic acid, n-hexanoic acid, n-heptanoic acid, n-octanoic acid, or n-nonanoic acid). Among these, pentanoic acid and/or heptanoic acid is more preferred.

The fatty acid may comprise, for example, a fatty acid having 10 to 24 carbon atoms as the fatty acid other than the fatty acid having 4 to 9 carbon atoms. Specific examples of the fatty acid having 10 to 24 carbon atoms include decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, heneicosanoic acid, docosanoic acid, tricosanoic acid, and tetracosanoic acid. These fatty acids having 10 to 24 carbon atoms may be linear or branched.

As the polyhydric alcohol for forming the polyol ester there is preferably used a polyhydric alcohol having 2 to 6 hydroxyl groups. The number of carbon atoms in the polyhydric alcohol is preferably 4 or more and more preferably 5 or more and is preferably 12 or less and more preferably 10 or less. Specifically, hindered alcohols such as neopentyl glycol, trimethylolethane, trimethylolpropane, trimethylolbutane, di-(trimethylolpropane), tri-(trimethylolpropane), pentaerythritol, and dipentaerythritol are preferred. Pentaerythritol or a mixed ester of pentaerythritol and dipentaerythritol is more preferred in that compatibility with refrigerants and hydrolysis stability are particularly superior.

The complex ester is an ester of a fatty acid and a dibasic acid with a monohydric alcohol and a polyol. As the fatty acid, the dibasic acid, the monohydric alcohol, and the polyol there can be used the same as those which are mentioned as examples in the descriptions of the dibasic acid ester and the polyol ester.

The carbonic acid ester is a compound having a carbonic acid ester structure represented by the following formula (A) in the molecule. The carbonic acid ester may have one carbonic acid ester structure or two or more such structures per molecule.

[Chemical Formula 1]

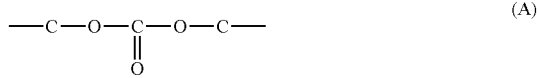

(A)

As the alcohol for forming the carbonic acid ester there can be used, for example, the aliphatic alcohols and polyols as mentioned above and, alternatively, polyglycol or an adduct of a polyol with polyglycol can be used. The carbonic acid ester may include a carbonic acid and a fatty acid and/or a dibasic acid.

Among carbonic acid esters, a carbonic acid ester having a structure represented by the following formula (A-1) is preferred.

[Chemical Formula 2]

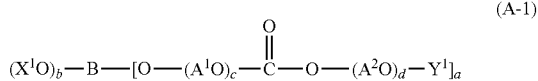

(A-1)

[In the above formula (A-1), $X^1$ represents a hydrogen atom, an alkyl group, a cycloalkyl group, or a group represented by the following formula (A-2):

(A-2)

(in the above formula (A-2), $Y^2$ represents a hydrogen atom, an alkyl group, or a cycloalkyl group, $A^3$ represents an alkylene group having 2 to 4 carbon atoms, and e represents an integer of 1 to 50), $A^1$ and $A^2$ may be the same or different and each represent an alkylene group having 2 to 4 carbon atoms, $Y^1$ represents a hydrogen atom, an alkyl group, or a cycloalkyl group, B represents a residue of a compound having 3 to 20 hydroxyl groups, a represents an integer of 1 to 20, b represents an integer of 0 to 19, a+b is 3 to 20, c represents an integer of 0 to 50, and d represents an integer of 1 to 50.]

In the above formula (A-1), $X^1$ represents a hydrogen atom, an alkyl group, a cycloalkyl group, or a group represented by the above formula (A-2). The number of carbon atoms in the alkyl group is not particularly limited, but is typically 1 to 24, preferably 1 to 18, and more preferably 1 to 12. The alkyl group may be liner or branched.

Specific examples of the alkyl group having 1 to 24 carbon atoms include: a methyl group, an ethyl group, an n-propyl group, an isopropyl group, an n-butyl group, an isobutyl group, a sec-butyl group, a tert-butyl group, a linear or branched pentyl group, a linear or branched hexyl group, a linear or branched heptyl group, a linear or branched octyl group, a linear or branched nonyl group, a linear or branched decyl group, a linear or branched undecyl group, a linear or branched dodecyl group, a linear or branched tridecyl group, a linear or branched tetradecyl group, a linear or branched pentadecyl group, a linear or branched hexadecyl group, a linear or branched heptadecyl group, a linear or branched octadecyl group, a linear or branched nonadecyl group, a linear or branched eicosyl group, a linear or branched heneicosyl group, a linear or branched docosyl group, a linear or branched tricosyl group, and a linear or branched tetracosyl group.

Specific examples of the cycloalkyl group include a cyclopentyl group, a cyclohexyl group, and a cycloheptyl group.

Examples of the alkylene group having 2 to 4 carbon atoms which is represented by $A^3$ in the above formula (A-2) include an ethylene group, a propylene group, a trimethylene group, a butylene group, a tetramethylene group, a 1-methyltrimethylene group, a 2-methyltrimethylene group, a 1,1-dimethylethylene group, and a 1,2-dimethylethylene group.

$Y^2$ in the above formula (A-2) is a hydrogen atom, an alkyl group, or a cycloalkyl group. The number of carbon atoms in the alkyl group is not particularly limited, but is typically 1 to 24, preferably 1 to 18, and more preferably 1 to 12. The alkyl group may be linear or branched. Specific examples of the alkyl group having 1 to 24 carbon atoms include the groups listed in the description of $X^1$.

Specific examples of the cycloalkyl group include a cyclopentyl group, a cyclohexyl group, and a cycloheptyl group.

It is preferable for $Y^2$ to be a hydrogen atom or an alkyl group having 1 to 12 carbon atoms among these examples, and it is more preferable for $Y^2$ to be a hydrogen atom, a methyl group, an ethyl group, an n-propyl group, an iso-propyl group, an n-butyl group, an iso-butyl group, a sec-butyl group, a tert-butyl group, an n-pentyl group, an iso-pentyl group, a neo-pentyl group, an n-hexyl group, an iso-hexyl group, an n-heptyl group, an iso-heptyl group, an n-octyl group, an iso-octyl group, an n-nonyl group, an iso-nonyl group, an n-decyl group, an iso-decyl group, an n-undecyl group, an iso-undecyl group, an n-dodecyl group, or an iso-dodecyl group.

It is preferable for $X^1$ to be a hydrogen atom, an alkyl group having 1 to 12 carbon atoms, or a group represented by the formula (A-2), and it is more preferable for $X^1$ to be a hydrogen atom, a methyl group, an ethyl group, an n-propyl group, an iso-propyl group, an n-butyl group, an iso-butyl group, a sec-butyl group, a tert-butyl group, an n-pentyl group, an iso-pentyl group, a neo-pentyl group, an n-hexyl group, an iso-hexyl group, an n-heptyl group, an iso-heptyl group, an n-octyl group, an iso-octyl group, an n-nonyl group, an iso-nonyl group, an n-decyl group, an iso-decyl group, an n-undecyl group, an iso-undecyl group, an n-dodecyl group, an iso-dodecyl group, or a group represented by the formula (A-2).

Specific examples of the compound that has 3 to 20 hydroxyl groups and whose residue is B include the polyols mentioned above.

$A^1$ and $A^2$ may be the same or different and each represent an alkylene group having 2 to 4 carbon atoms. Specific examples include an ethylene group, a propylene group, a trimethylene group, a butylene group, a tetramethylene group, a 1-methyltrimethylene group, a 2-methyltrimethylene group, a 1,1-dimethylethylene group, and a 1,2-dimethylethylene group.

$Y^1$ is a hydrogen atom, an alkyl group, or a cycloalkyl group. The number of carbon atoms in the alkyl group is not particularly limited, but is typically 1 to 24, preferably 1 to 18, and more preferably 1 to 12. The alkyl group may be linear or branched. Specific examples of the alkyl group having 1 to 24 carbon atoms include the groups listed in the description of $X^1$.

Specific examples of the cycloalkyl group include a cyclopentyl group, a cyclohexyl group, and a cycloheptyl group.

It is preferable for $Y^1$ to be a hydrogen atom or an alkyl group having 1 to 12 carbon atoms among these examples, and it is more preferable for $Y^1$ to be a hydrogen atom, a methyl group, an ethyl group, an n-propyl group, an iso-propyl group, an n-butyl group, an iso-butyl group, a sec-butyl group, a tert-butyl group, an n-pentyl group, an iso-pentyl group, a neo-pentyl group, an n-hexyl group, an iso-hexyl group, an n-heptyl group, an iso-heptyl group, an n-octyl group, an iso-octyl group, an n-nonyl group, an iso-nonyl group, an n-decyl group, an iso-decyl group, an n-undecyl group, an iso-undecyl group, an n-dodecyl group, or an iso-dodecyl group.

In the above formulae (A-1) and (A-2), c, d, and e each represent a degree of polymerization of a polyoxyalkylene moiety. These polyoxyalkylene moieties may have one type of oxyalkylene group or two or more types of oxyalkylene groups. When the polyoxyalkylene moieties have two or more types of polyoxyalkylene groups, the polymerization form of each oxyalkylene group is not particularly limited, and may be random copolymerization or block copolymerization.

The polyvinyl ether has a structural unit represented by the following formula (1).

[Chemical Formula 3]

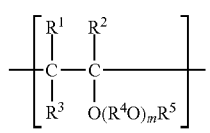

(1)

[In the formula, $R^1$, $R^2$, and $R^3$ may be the same or different from each other, and each represent a hydrogen atom or a hydrocarbon group, $R^4$ represents a divalent hydrocarbon group or a divalent, ether-linked oxygen-containing hydrocarbon group, $R^5$ represents a hydrocarbon group, and m represents an integer of 0 or more. When m is 2 or more, two or more $R^4$ may be the same or different from each other.

The number of carbon atoms in the hydrocarbon groups represented by $R^1$, $R^2$, and $R^3$ in the formula (1) is preferably 1 or more, more preferably 2 or more, and even more preferably 3 or more, and is preferably 8 or less, more preferably 7 or less, and even more preferably 6 or less. It is preferable that at least one of $R^1$, $R^2$, and $R^3$ in the formula (1) be a hydrogen atom, and it is more preferable that all of $R^1$, $R^2$, and $R^3$ be a hydrogen atom.

The number of carbon atoms in the divalent hydrocarbon group or ether-linked oxygen-containing hydrocarbon group represented by $R^4$ in the formula (1) is preferably 1 or more, more preferably 2 or more, and even more preferably 3 or more, and is preferably 10 or less, more preferably 8 or less, and even more preferably 6 or less. The divalent, ether-linked oxygen-containing hydrocarbon group represented by $R^4$ in the formula (1) may be, for example, a hydrocarbon group having an oxygen atom forming an ether bond in a side chain.

It is preferable for $R^5$ in the formula (1) to be a hydrocarbon group having 1 to 20 carbon atoms. Examples of this hydrocarbon group include an alkyl group, a cycloalkyl group, a phenyl group, an aryl group, and an arylalkyl group. Among these, an alkyl group is preferred, and an alkyl group having 1 to 5 carbon atoms is more preferred.

m in the formula (1) is preferably 0 or more, more preferably 1 or more, and even more preferably 2 or more, and is preferably 20 or less, more preferably 18 or less, and even more preferably 16 or less. It is preferable that the average of m in all the structural units constituting the polyvinyl ether be 0 to 10.

The polyvinyl ether may be a homopolymer constituted by one type of structural unit selected from those represented by the formula (1), may be a copolymer constituted by two or more types of structural units selected from those represented by the formula (1), or may be a copolymer constituted by a structural unit represented by the formula (1) and another structural unit. With the polyvinyl ether being a copolymer, the requirement for the compatibility of the refrigerating machine oil with refrigerants can be met and, at the same time, the lubricating properties, electrical insulating properties, and hygroscopic properties or the like can be further improved. In this case, the above various properties of the refrigerating machine oil can be made desirable by appropriately selecting, for example, the type of the monomer as a raw material, the type of an initiator, and the ratio between the structural units in the copolymer. It is therefore possible to freely obtain a refrigerating machine oil meeting the requirements, for example, for lubricating properties and compatibility which vary depending on, for example, the type of a compressor in a refrigerating system or an air-conditioning system, the material of the part to be lubricated, the refrigerating capacity, and the type of the refrigerant. The copolymer may be either a block copolymer or a random copolymer.

When the polyvinyl ether is a copolymer, it is preferable for the copolymer to have: a structural unit (1-1) represented by the above formula (1) where $R^5$ is an alkyl group having 1 to 3 carbon atoms; and a structural unit (1-2) represented by the above formula (1) where $R^5$ is an alkyl group having 3 to 20, preferably 3 to 10, more preferably 3 to 8 carbon atoms. An ethyl group is particularly preferred as $R^5$ in the structural unit (1-1), and an isobutyl group is particularly preferred as $R^5$ in the structural unit (1-2). When the polyvinyl ether is a copolymer having the above structural units (1-1) and (1-2), it is preferable that the molar ratio between the structural unit (1-1) and the structural unit (1-2) be 5:95 to 95:5, more preferably 20:80 to 90:10, even more preferably 70:30 to 90:10. When the molar ratio is within the above range, it is likely that the compatibility with refrigerants can further be improved and the moisture uptake can be reduced.

Although the polyvinyl ether may consist only of the structural units represented by the above formula (1) or may alternatively be a copolymer further having a structural unit represented by the following formula (2). In this case, the copolymer may be either a block copolymer or a random copolymer.

[Chemical Formula 4]

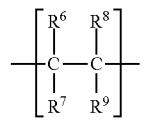

(2)

[In the formula, $R^6$ to $R^9$ may be the same or different from each other and each represent a hydrogen atom or a hydrocarbon group having 1 to 20 carbon atoms.]

The polyvinyl ether can be produced by polymerization of a vinyl ether monomer corresponding to the formula (1) or copolymerization of a vinyl ether monomer corresponding to the formula (1) and an olefinic double bond-containing hydrocarbon monomer corresponding to the formula (2). A monomer represented by the following formula (3) is suitable as the vinyl ether monomer corresponding to the structural unit represented by the formula (1).

[Chemical Formula 5]

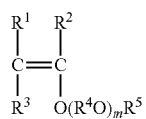

(3)

[In the formula, $R^1$, $R^2$, $R^3$, $R^4$, $R^5$, and m respectively represent the same as defined for $R^1$, $R^2$, $R^3$, $R^4$, $R^5$, and m in the formula (1).]

It is preferable for the polyvinyl ether to have the following terminal structure (A) or (B).

(A) A structure having one terminal represented by the formula (4) or (5) and the other terminal represented by the formula (6) or (7).

[Chemical Formula 6]

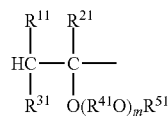

(4)

[In the formula, $R^{11}$, $R^{21}$, and $R^{31}$ may be the same or different from each other and each represent a hydrogen atom or a hydrocarbon group having 1 to 8 carbon atoms, $R^{41}$ represents a divalent hydrocarbon group or divalent ether-linked oxygen-containing hydrocarbon group having 1 to 10 carbon atoms, $R^{51}$ represents a hydrocarbon group having 1 to 20 carbon atoms, and m represents the same as defined for m in the formula (1). When m is 2 or more, two or more $R^{41}$ may be the same or different from each other.]

[Chemical Formula 7]

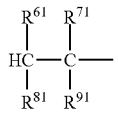
(5)

[In the formula, $R^{61}$, $R^{71}$, $R^{81}$, and $R^{91}$ and may be the same or different from each other and each represent a hydrogen atom or a hydrocarbon grout having 1 to 20 carbon atoms.]

[Chemical Formula 8]

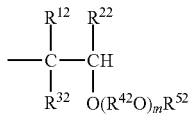
(6)

[In the formula, $R^{12}$, $R^{22}$, and $R^{32}$ may be the same or different from each other and each represent a hydrogen atom or a hydrocarbon group having 1 to 8 carbon atoms, $R^{42}$ represents a divalent hydrocarbon group or divalent ether-linked oxygen-containing hydrocarbon group having 1 to 10 carbon atoms, $R^{52}$ represents a hydrocarbon group having 1 to 20 carbon atoms, and m represents the same as defined for m in the formula (1). When m is 2 or more, two or more $R^{41}$ may be the same or different.]

[Chemical Formula 9]

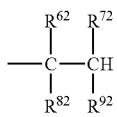
(7)

[In the formula, $R^{62}$, $R^{72}$, $R^{82}$, and $R^{92}$ may be the same or different from each other and each represent a hydrogen atom or a hydrocarbon group having 1 to 20 carbon atoms.]

(B) A structure having one terminal represented by the above formula (4) or (5) and the other terminal represented by the following formula (8).

[Chemical Formula 10]

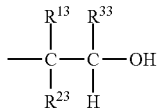
(8)

[In the formula, $R^{13}$, $R^{23}$, and $R^{33}$ may be the same or different from each other and each represent a hydrogen atom or a hydrocarbon group having 1 to 8 carbon atoms.]

Among such polyvinyl ethers, polyvinyl ethers corresponding to (a), (b), (c), (d), and (e) listed below are particularly suitable as a main component (base oil) of the refrigerating machine oil.

(a) A polyvinyl ether that has a structure having one terminal represented by the formula (4) or (5) and the other terminal represented by the formula (6) or (7) and for which, in the formula (1), $R^1$, $R^2$, and $R^3$ are each a hydrogen atom, m is an integer of 0 to 4, $R^4$ is a divalent hydrocarbon group having 2 to 4 carbon atoms, and $R^5$ is a hydrocarbon group having 1 to 20 carbon atoms.

(b) A polyvinyl ether that has only the structural unit represented by the formula (1), that has a structure having one terminal represented by the formula (4) and the other terminal represented by the formula (6), and for which, in the formula (1), $R^1$, $R^2$, and $R^3$ are each a hydrogen atom, m is an integer of 0 to 4, $R^4$ is a divalent hydrocarbon group having 2 to 4 carbon atoms, and $R^5$ is a hydrocarbon group having 1 to 20 carbon atoms.

(c) A polyvinyl ether that has a structure having one terminal represented by the formula (4) or (5) and the other terminal represented by the formula (8) and for which, in the formula (1), $R^1$, $R^2$, and $R^3$ are each a hydrogen atom, m is an integer of 0 to 4, $R^4$ is a divalent hydrocarbon group having 2 to 4 carbon atoms, and $R^5$ is a hydrocarbon group having 1 to 20 carbon atoms.

(d) A polyvinyl ether that has only the structural unit represented by the formula (1), that has a structure having one terminal represented by the formula (5) and the other terminal represented by the formula (8) and for which, in the formula (1), $R^1$, $R^2$, and $R^3$ are each a hydrogen atom, m is an integer of 0 to 4, $R^4$ is a divalent hydrocarbon group having 2 to 4 carbon atoms, and $R^5$ is a hydrocarbon group having 1 to 20 carbon atoms.

(e) A polyvinyl ether that corresponds to any one of the above (a), (b), (c), and (d) and that has a structural unit represented by the formula (1) where $R^5$ is a hydrocarbon group having 1 to 3 carbon atoms and a structural unit represented by the formula (1) where $R^5$ is a hydrocarbon group having 3 to 20 carbon atoms.

A side reaction may occur during the production process of the polyvinyl ether to cause an unsaturated group such as an aryl group to be formed in the molecule, and, in terms of improvement in the thermal stability of the polyvinyl ether itself, prevention of sludge generation caused by polymer formation, and prevention of peroxide formation caused by deterioration in antioxidative properties (oxidation inhibiting properties), a polyvinyl ether having a low degree of unsaturation derived from an unsaturated group or the like is preferred as the polyvinyl ether. It is preferable that the degree of unsaturation of the polyvinyl ether be 0.04 meq/g or less, more preferably 0.03 meq/g or less, even more preferably 0.02 meq/g or less. It is preferable that the peroxide value of the polyvinyl ether be 10.0 meq/kg or less, more preferably 5.0 meq/kg or less, even more preferably 1.0 meq/kg. It is preferable that the carbonyl value of the polyvinyl ether be 100 ppm by weight or less, more preferably 50 ppm by weight or less, even more preferably 20 ppm by weight or less. It is preferable that the hydroxyl value of the polyvinyl ether be 10 mgKOH/g or less, more preferably 5 mgKOH/g or less, even more preferably 3 mgKOH/g or less.

The degree of unsaturation, peroxide value, and carbonyl value in the present invention refer to values measured by the JOCS Standard Methods for the Analysis of Fats, Oils and Related Materials specified by Japan Oil Chemists' Society. That is, the degree of unsaturation in the present invention refers to a value (meq/g) determined as follows: A Wijs solution (acetic acid solution of ICl) is reacted with a sample, which is then left in a dark place; excess ICl was subsequently reduced to iodine; the iodine was titrated with sodium thiosulfate to calculate an iodine value; and this iodine value was converted to a vinyl equivalent. The peroxide value in the present invention refers to a value (meq/kg) determined as follows: Potassium iodide is added to a sample; the resulting free iodine was titrated with sodium thiosulfate; and the amount of the free iodine is converted to a milliequivalent relative to 1 kg of the sample. The carbonyl value in the present invention refers to a value (ppm by weight) determined as follows: 2,4-dinitrophenyl-hydrazine was reacted with a sample to produce color-forming quinoid ions; the absorbance of the sample at 480 nm was measured; and the amount of the quinoid ions was converted to a carbonyl content on the basis of a calibration curve determined beforehand using cinnamaldehyde as a reference material. The hydroxyl value in the present invention refers to a hydroxyl value measured according to JIS K 0070: 1992.

The polyalkylene glycol may have various chemical structures, and examples of typical compounds include polyethylene glycol, polypropylene glycol, and polybutylene glycol. The unit structure of the polyalkylene glycol is oxyethylene, oxypropylene, or oxybutylene. Polyalkylene glycols having these unit structures can be obtained by ring-opening polymerization using the monomers, ethylene oxide, propylene oxide, and butylene oxide, respectively, as raw materials.

Examples of the polyalkylene glycol include compounds represented by the following formula (9).

$$R^\alpha-[(OR^\beta)_f-OR^\gamma]_g \qquad (9)$$

[In the formula (1), $R^\alpha$ represents a hydrogen atom, an alkyl group having 1 to 10 carbon atoms, an acyl group having 2 to 10 carbon atoms, or a residue of a compound having 2 to 8 hydroxyl groups, $R^\beta$ represents an alkylene group having 2 to 4 carbon atoms, $R^\gamma$ represents a hydrogen atom, an alkyl group having 1 to 10 carbon atoms, or an acyl group having 2 to 10 carbon atoms, f represents an integer of 1 to 80, and g represents an integer of 1 to 8.]

In the formula (9), the alkyl group represented by $R^\alpha$ or $R^\gamma$ may be linear, branched, or cyclic. The number of carbon atoms in the alkyl group is preferably 1 to 10 and more preferably 1 to 6. If the number of carbon atoms in the alkyl group is more than 10, the compatibility with refrigerants tends to decrease.

The alkyl moiety of the acyl group represented by $R^\alpha$ or $R^\gamma$ may be linear, branched, or cyclic. The number of carbon atoms in the acyl group is preferably 2 to 10 and more preferably 2 to 6. If the number of carbon atoms in the acyl group is more than 10, the compatibility with refrigerants may decrease, which may cause phase separation.

When both of the groups represented by $R^\alpha$ and $R^\gamma$ are alkyl groups or acyl groups, the groups represented by $R^\alpha$ and $R^\gamma$ may be the same or different. When g is 2 or more, the two or more groups represented by $R^\alpha$ and $R^\gamma$ in the same molecule may be the same or different.

When the group represented by $R^\alpha$ is a residue of a compound having 2 to 8 hydroxyl groups, this compound may be linear or cyclic.

For the polyalkylene glycol represented by the above formula (9), it is preferable that at least one of $R^\alpha$ and $R^\gamma$ be an alkyl group (more preferably an alkyl group having 1 to 4 carbon atoms), and it is particularly preferable that at least one of $R^\alpha$ and $R^\gamma$ be a methyl group, in terms of the compatibility with refrigerants.

In terms of thermal and chemical stability, it is preferable that both of $R^\alpha$ and $R^\gamma$ be alkyl groups (more preferably alkyl groups having 1 to 4 carbon atoms), and it is more preferable that both of $R^\alpha$ and $R^\gamma$ be a methyl group.

In terms of ease of production and cost, it is preferable that one of $R^\alpha$ and $R^\gamma$ be an alkyl group (more preferably an alkyl group having 1 to 4 carbon atoms) and the other be a hydrogen atom, and it is more preferable that one of $R^\alpha$ and $R^\gamma$ be a methyl group and the other be a hydrogen atom. In terms of lubricating properties and sludge dissolving properties, it is preferable that both of $R^\alpha$ and $R^\gamma$ be a hydrogen atom.

$R^\beta$ in the above formula (9) represents an alkylene group having 2 to 4 carbon atoms, and specific examples of such an alkylene group include an ethylene group, a propylene group, and a butylene group. Examples of the oxyalkylene group represented by $OR^\beta$ include an oxyethylene group, an oxypropylene group, and an oxybutylene group. The polyoxyalkylene group represented by $(OR^\beta)_f$ may be constituted by one type of oxyalkylene group or may be constituted by two or more types of oxyalkylene groups.

Among polyalkylene glycols represented by the above formula (9), a copolymer containing an oxyethylene group (EO) and an oxypropylene group (PO) is preferred in terms of compatibility with refrigerants and viscosity-temperature characteristics. In this case, it is preferable that the proportion of the oxyethylene group in the total of the oxyethylene group and oxypropylene group (EO/(PO+BO)) be in the range of 0.1 to 0.8, more preferably in the range of 0.3 to 0.6, in terms of seizure load and viscosity-temperature characteristics.

In terms of hygroscopic properties or thermal and oxidative stability, it is preferable that EO/(PO+BO) be in the range of 0 to 0.5, more preferably in the range of 0 to 0.2, most preferably 0 (i.e., propylene oxide homopolymer).

f in the above formula (9) represents the number of repeating oxyalkylene groups $OR^\beta$ (degree of polymerization) and is an integer of 1 to 80. g is an integer of 1 to 8. For example, when $R^\alpha$ is an alkyl group or an acyl group, g is 1. When $R^\alpha$ is a residue of a compound having 2 to 8 hydroxyl groups, g corresponds to the number of hydroxyl groups that the compound has.

The product of f and g (f×g) is not particularly limited, but it is preferable that the average of values of f×g be 6 to 80 in order to achieve the above various properties required of the refrigerating machine oil in a well-balanced manner.

The number average molecular weight of the polyalkylene glycol represented by the formula (9) is preferably 500 or more and more preferably 600 or more and is preferably 3000 or less, more preferably 2000 or less, and even more preferably 1500 or less. It is preferable for f and g in the formula (9) to be such numbers that the number average molecular weight of the polyalkylene glycol meets the above requirement. If the number average molecular weight of the polyalkylene glycol is too low, the lubricating properties in the presence of a refrigerant are insufficient. If the number average molecular weight is too high, the composition range over which compatibility is exhibited for refrigerants at low temperatures is narrow, and poor lubrication of a refrigerant compressor or inhibition of heat exchange in an evaporator is likely to occur.

The hydroxyl value of the polyalkylene glycol is, but not limited to, 100 mgKOH/g or less, preferably 50 mgKOH/g or less, more preferably 30 mgKOH/g or less, most preferably 10 mgKOH/g or less.

The polyalkylene glycol can be synthesized using a commonly-known method ("Alkyleneoxide Polymer", Mitsuta Shibata et al., KAIBUNDO, issued on Nov. 20, 1990). For example, the polyalkylene glycol represented by the above formula (9) is obtained by allowing one or more types of specified alkylene oxides to undergo addition-polymerization with an alcohol (R$^\alpha$OH; R$^\alpha$ represents the same as defined for R$^\alpha$ in the above formula (9)) and further etherifying or esterifying the terminal hydroxyl group. When two or more types of alkylene oxides are used in the above production process, the resulting polyalkylene glycol may be either a random copolymer or a block copolymer, and it is preferable for the polyalkylene glycol to be a block copolymer in terms of better oxidative stability and lubricating properties, while in terms of better low-temperature fluidity, it is preferable for the polyalkylene glycol to be a random copolymer.

The kinematic viscosity of the polyalkylene glycol at 100° C. is preferably 5 mm$^2$/s or more, more preferably 6 mm$^2$/s or more, even more preferably 7 mm$^2$/s or more, particularly preferably 8 mm$^2$/s or more, and most preferably 10 mm$^2$/s or more and is preferably 20 mm$^2$/s or less, more preferably 18 mm$^2$/s or less, even more preferably 16 mm$^2$/s or less, and particularly preferably 15 mm$^2$/s or less. If the kinematic viscosity at 100° C. is less than the lower limit, the lubricating properties in the presence of a refrigerant are insufficient, while if the upper limit is exceeded, the composition range over which compatibility is exhibited for refrigerants is narrow, and poor lubrication of a refrigerant compressor or inhibition of heat exchange in an evaporator is likely to occur. The kinematic viscosity of the polyalkylene glycol at 40° C. is preferably 10 mm$^2$/s or more and more preferably 20 mm$^2$/s or more and is preferably 200 mm$^2$/s or less and more preferably 150 mm$^2$/s or less. If the kinematic viscosity at 40° C. is less than 10 mm$^2$/s, the lubricating properties or the hermeticity of a compressor are likely to deteriorate, while if 200 mm$^2$/s is exceeded, the composition range over which compatibility is exhibited for refrigerants at low temperatures is narrow, and poor lubrication of a refrigerant compressor or inhibition of heat exchange in an evaporator is likely to occur.

The pour point of the polyalkylene glycol is preferably −10° C. or lower and more preferably −20° C. or lower and is preferably −50° C. or higher. If a polyalkylene glycol with a pour point higher than −10° C. is used, the refrigerating machine oil is likely to solidify at a low temperature in a refrigerant circulation system. The pour point in the present invention refers to a pour point specified in JIS K 2269.

During the production process of the polyalkylene glycol represented by the above formula (9), an alkyleneoxide such as propylene oxide may undergo a side reaction to form an unsaturated group such as an aryl group in the molecule. If an unsaturated group is formed in the polyalkylene glycol molecule, the following phenomena are likely to occur: the thermal stability of the polyalkylene glycol itself is reduced; a polymer is produced to cause generation of sludge; and antioxidative properties (oxidation inhibiting properties) deteriorate to cause formation of a peroxide. In particular, if a peroxide is formed, the peroxide is decomposed to form a compound having a carbonyl group, and the compound having a carbonyl group will generate sludge, so that capillary clogging is likely to occur.

Thus, a polyalkylene glycol having a low degree of unsaturation derived from an unsaturated group or the like is preferred as the polyalkylene glycol. It is preferable that the degree of unsaturation of the polyalkylene glycol be 0.04 meq/g or less, more preferably 0.03 meq/g or less, even more preferably 0.02 meq/g or less. It is preferable that the peroxide value be 10.0 meq/kg or less, more preferably 5.0 meq/kg or less, even more preferably 1.0 meq/kg. It is preferable that the carbonyl value be 100 ppm by weight or less, more preferably 50 ppm by weight or less, even more preferably 20 ppm by weight or less.

To obtain a polyalkylene glycol having a low degree of unsaturation, a low peroxide value, and a low carbonyl value, the reaction temperature during reaction of propylene oxide is preferably 120° C. or less and more preferably 110° C. or less. If an alkali catalyst is used in production, the use of an inorganic adsorbent, such as activated carbon, activated white earth, bentonite, dolomite, or aluminosilicate, for removing the catalyst can reduce the degree of unsaturation. Increase in peroxide value or carbonyl value can be prevented also by adding an antioxidant or avoiding contact with oxygen as much as possible during production or use of the polyalkylene glycol.

The polyalkylene glycol needs to have a carbon/oxygen molar ratio within a predetermined range. A polymer having the molar ratio within the range can be produced by selecting and adjusting the types and mixing ratio of the monomers as raw materials.

The base oil may further contain, for example, a mineral oil or a hydrocarbon oil such as an olefin polymer, a naphthalene compound, or an alkylbenzene, in addition to the above oxygen-containing oil. It is preferable that the content of the above oxygen-containing oil be 5 mass % or more, more preferably 30 mass % or more, even more preferably 95 mass % or more, with respect to the total amount of the base oil.

The refrigerating machine oil may further contain various additives where necessary. Examples of such additives include an acid scavenger, an oxidation inhibitor, an extreme-pressure agent, an oily agent, an anti-foaming agent, a metal deactivator, an anti-wear agent, a viscosity index improver, a pour point depressant, and a detergent dispersant. It is preferable that the content of the additive be 5 mass % or less, more preferably 2 mass % or less, with respect to the total amount of the refrigerating machine oil.

It is preferable for the refrigerating machine oil to further contain an acid scavenger among the above additives, in terms of further improving the thermal and chemical stability. Examples of the acid scavenger include an epoxy compound and a carbodiimide compound.

Examples of the epoxy compound include, but are not limited to, a glycidyl ether epoxy compound, a glycidyl ester epoxy compound, an oxirane compound, an alkyloxirane compound, an alicyclic epoxy compound, an epoxidized fatty acid monoester, and an epoxidized vegetable oil. One of these epoxy compounds may be used alone or two or more thereof may be used in combination.

Examples of the glycidyl ether epoxy compound include n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, and polyalkylene glycol diglycidyl ether.

Examples of the glycidyl ester epoxy compound include glycidyl benzoate, glycidyl neodecanoate, glycidyl-2,2-dimethyloctanoate, glycidyl acrylate, and glycidyl methacrylate.

The alicyclic epoxy compound is a compound having a partial structure in which carbon atoms included in an epoxy group are included as such in the alicyclic ring, the compound being represented by the following formula (10).

[Chemical Formula 11]

(10)

Examples of the alicyclic epoxy compound include 1,2-epoxycyclohexane, 1,2-epoxycyclopentane, 3',4'-epoxycyclohexylmethyl-3,4-epoxycyclohexanecarboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hepto-3-yl)-spiro(1,3-dioxane-5,3'-[7]oxabicyclo[4.1.0]heptane, 4-(1'-methylepoxyethyl)-1,2-epoxy-2-methylcyclohexane, and 4-epoxyethyl-1,2-epoxycyclohexane.

Examples of the aryloxirane compound include 1,2-epoxystyrene and alkyl-1,2-epoxystyrene. Examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane, and 1,2-epoxyeicosane.

Examples of the epoxidized fatty acid monoester include an ester of an epoxidized fatty acid having 12 to 20 carbon atoms with an alcohol having 1 to 8 carbon atoms, phenol, or an alkylphenol. As the epoxidized fatty acid monoester there are preferably used esters of epoxystearic acid with butyl, hexyl, benzyl, cyclohexyl, methoxyethyl, octyl, phenyl, and butylphenyl.

Examples of the epoxidized vegetable oil include epoxy compounds of vegetable oils such as soybean oil, linseed oil, and cottonseed oil.

The carbodiimide compound is not particularly limited and, for example, dialkylcarbodiimide, diphenylcarbodiimide, and bis(alkylphenyl)carbodiimide can be used. Examples of the dialkylcarbodiimide include diisopropylcarbodiimide and dicyclohexylcarbodiimide. Examples of the bis(alkylphenyl)carbodiimide include ditolylcarbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide, and bis(nonylphenyl)carbodiimide.

In order for the refrigerating machine oil to be superior in the properties required of the refrigerating machine oil such as lubricating properties, compatibility, thermal and chemical stability, and electrical insulating properties, it is preferable that the content of the base oil in the refrigerating machine oil be 80 mass % or more, more preferably 90 mass % or more, even more preferably 95 mass % or more, with respect to the total amount of the refrigerating machine oil.

The kinematic viscosity of the refrigerating machine oil at 40° C. may be preferably 3 mm$^2$/s or more, more preferably 4 mm$^2$/s or more and even more preferably 5 mm$^2$/s or more and may be preferably 1000 mm$^2$/s or less, more preferably 500 mm$^2$/s or less, and even more preferably 400 mm$^2$/s or less. The kinematic viscosity of the refrigerating machine oil at 100° C. may be preferably 1 mm$^2$/s or more and more preferably 2 mm$^2$/s or more and may be preferably 100 mm$^2$/s or less and more preferably 50 mm$^2$/s or less.

The volume resistivity of the refrigerating machine oil is not particularly limited, but may be preferably $1.0 \times 10^9$ Ω·m or more, more preferably $1.0 \times 10^{10}$ Ω·m or more, and even more preferably $1.0 \times 10^{11}$ Ω·m or more. Good electrical insulating properties are often needed, in particular, for use in a hermetic refrigerating machine. The volume resistivity in the present invention refers to a volume resistivity at 25° C. measured according to JIS C 2101 "Testing methods of electrical insulating oils".

The moisture content of the refrigerating machine oil is not particularly limited, but is preferably 200 ppm or less, more preferably 100 ppm or less, and even more preferably 50 ppm or less, with respect to the total amount of the refrigerating machine oil. It is required that the moisture content be low, in particular, for use in a hermetic refrigerating machine, in terms of influence on the thermal and chemical stability and electrical insulating properties of the refrigerating machine oil.

The acid value of the refrigerating machine oil is not particularly limited, but may be preferably 0.1 mgKOH/g or less and more preferably 0.05 mgKOH/g or less, in order to prevent the corrosion of metals used in the refrigerating machine or pipes and prevent the decomposition of the ester contained in the refrigerating machine oil according to the present embodiment. The acid value in the present invention refers to an acid value measured according to JIS K 2501 "Petroleum products and lubricants-Determination of neutralization number".

The ash content of the refrigerating machine oil is not particularly limited, but may be preferably 100 ppm or less and more preferably 50 ppm or less in order to increase the thermal and chemical stability of the refrigerating machine oil and thus reduce the generation of sludge or the like. The ash content in the present invention refers to an ash content measured according to JIS K 2272 "Crude oil and petroleum products-Determination of ash and sulfated ash".

The pour point of the refrigerating machine oil may be preferably −10° C. or lower, more preferably −20° C. or lower, and even more preferably −30° C. or lower. The pour point in the present invention refers to a pour point measured according to JIS K 2269.

The refrigerating machine oil according to the present embodiment is used with a trifluoroethylene (HFO-1123) refrigerant. The working fluid composition for a refrigerating machine according to the present embodiment comprises a trifluoroethylene (HFO-1123) refrigerant.

That is, a composition containing at least one oxygen-containing oil having a carbon/oxygen molar ratio of 2.5 or more and 5.8 or less is suitably used as a component of a refrigerating machine oil used with a trifluoroethylene refrigerant or as a component of a working fluid composition for a refrigerating machine containing a refrigerating machine oil and a trifluoroethylene refrigerant.

The composition containing at least one oxygen-containing oil having a carbon/oxygen molar ratio of 2.5 or more and 5.8 or less is suitably used for manufacturing a refrigerating machine oil used with a trifluoroethylene refrigerant or for manufacturing a working fluid composition for a refrigerating machine containing a refrigerating machine oil and a trifluoroethylene refrigerant.

The refrigerant used with the refrigerating machine oil according to the present embodiment and the refrigerant contained in the working fluid composition for a refrigerating machine according to the present embodiment may further contain, in addition to trifluoroethylene (HFO-1123), a commonly-known refrigerant such as a saturated hydrofluorocarbon refrigerant or unsaturated hydrofluorocarbon refrigerant. In terms of the stability of the refrigerating machine oil in a refrigerant environment, it is preferable that the content of trifluoroethylene (HFO-1123) be 90 mass % or less, more preferably 60 mass % or less, even more preferably 50 mass % or less, particularly preferably 40 mass % or less, most preferably 20 mass % or less, with respect to the total amount of the refrigerant. In terms of reduction in GWP, it is preferable that the content of trifluoroethylene (HFO-1123) be 20 mass % or more, more preferably 40 mass % or more, even more preferably 50 mass % or more, particularly preferably 60 mass % or more, most preferably 90 mass % or more, with respect to the total amount of the refrigerant.

Examples of the saturated hydrofluorocarbon refrigerant include one, or a mixture of two or more, selected from the group consisting of difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), and 1,1,1,3,3-pentafluorobutane (HFC-365mfc). Among these, difluoromethane (HFC-32) and 1,1,1,2-tetrafluoroethane (HFC-134a) are preferred in terms of the stability of the refrigerating machine oil in a refrigerant environment and reduction in GWP.

Examples of the unsaturated hydrofluorocarbon refrigerant include one, or a mixture of two or more, selected from the group consisting of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). Among these, 2,3,3,3-tetrafluoropropene (HFO-1234yf) is preferred in terms of the stability of the refrigerating machine oil in a refrigerant environment and reduction in GWP.

The content of the refrigerating machine oil in the working fluid composition for a refrigerating machine is not particularly limited, but may be preferably 1 part by mass or more and more preferably 2 parts by mass or more and may be preferably 500 parts by mass or less and more preferably 400 parts by mass or less, per 100 parts by mass of the refrigerant.

The working fluid composition for a refrigerating machine according to the present embodiment is preferably used in: room air conditioners having a reciprocating or rotary hermetic compressor; refrigerating chambers; and open-type or hermetic-type car air conditioners. The working fluid composition for a refrigerating machine and refrigerating machine oil according to the present embodiment are preferably used, for example, in dehumidifiers, water heaters, freezers, freezing/refrigerating warehouses, vending machines, showcases, and cooling systems of chemical plants etc. In addition, the working fluid composition for a refrigerating machine and refrigerating machine oil according to the present embodiment are preferably used also in apparatuses having a centrifugal compressor.

EXAMPLES

Hereinafter, the present invention will be more specifically described by way of examples; however, the present invention is not limited to the examples described below.

Polyol esters of fatty acids having compositions shown in Table 1 with a polyhydric alcohol were prepared as base oils 1 to 6. The abbreviations in the table denote the following compounds.

TABLE 1

|  |  | Base oil 1 | Base oil 2 | Base oil 3 | Base oil 4 | Base oil 5 | Base oil 6 |
|---|---|---|---|---|---|---|---|
| Composition of fatty acid (mol %) | iC4 | — | 35 | — | — | — | — |
|  | nC5 | — | — | 40 | — | — | 80 |
|  | iC8 | 50 | — | — | — | 50 | — |
|  | iC9 | 50 | 65 | 60 | — | — | 20 |
|  | nC10 | — | — | — | 100 | — | — |
|  | iC18 | — | — | — | — | 50 | — |
| Polyhydric alcohol |  | PET | PET | PET | PET | PET | PET | iC4: 2-methylpropanoic acid
nC5: n-pentanoic acid
iC8: 2-ethylhexanoic acid
iC9: 3,5,5-trimethylhexanoic acid
nC10: n-decanoic acid
iC18: 2-ethylhexadecanoic acid
PET: Pentaerythritol Sample oils 1 to 7 having compositions shown in Table 2 were prepared using the base oils 1 to 6 and the additives listed below.

Additive 1: Glycidyl neodecanoate
Additive 2: 2-ethylhexyl glycidyl ether
Additive 3: Bis(diisopropylphenyl)carbodiimide
Additive 4: Diisopropylcarbodiimide The stability test described hereinafter was conducted on each sample oil. The results are shown in Table 2.

(Stability Test)

The stability test was conducted according to JIS K 2211-09 (autoclave test). Specifically, 80 g of each sample oil whose moisture content was adjusted to 100 ppm was weighed into an autoclave, inside which were placed catalysts (iron, copper, and aluminum wires, all of which had a size of 1.6 mm outer diameter×50 mm length) and 20 g of any one refrigerant mixture selected from the refrigerant mixtures A to C listed below. This was followed by heating to 140° C. and, after 150 hours, the acid value (JIS C 2101) of the sample oil was measured.

Refrigerant mixture A: Refrigerant mixture of 2,3,3,3-tetrafluoropropene (HFO-1234yf) and trifluoroethylene (HFO-1123) (Mass ratio (HFO-1234yf/HFO-1123)=80/20)

Refrigerant mixture B: Refrigerant mixture of difluoromethane (HFC-32) and trifluoroethylene (HFO-1123) (Mass ratio (HFC-32/HFO-1123)=40/60)

Refrigerant mixture C: Refrigerant mixture of 1,1,1,2-tetrafluoroethane (HFC-134a) and trifluoroethylene (HFO-1123) (Mass ratio (HFC-134a/HFO-1123)=20/80)

TABLE 2

|  |  | Sample oil 1 | Sample oil 2 | Sample oil 3 | Sample oil 4 | Sample oil 5 | Sample oil 6 | Sample oil 7 |
|---|---|---|---|---|---|---|---|---|
| Composition of sample oil (mass % with respect | Base oil 1 | 99.00 | — | — | — | — | — | — |
|  | Base oil 2 | — | 99.45 | — | — | — | — | — |
|  | Base oil 3 | — | — | 99.00 | 100 | — | — | — |
|  | Base oil 4 | — | — | — | — | — | 99.00 | — |

TABLE 2-continued

|  |  | Sample oil 1 | Sample oil 2 | Sample oil 3 | Sample oil 4 | Sample oil 5 | Sample oil 6 | Sample oil 7 |
|---|---|---|---|---|---|---|---|---|
| to total amount of sample oil) | Base oil 5 | — | — | — | — | — | — | 100 |
|  | Base oil 6 | — | — | — | — | 99.80 | — | — |
|  | Additive 1 | 1.00 | — | — | — | — | 1.00 | — |
|  | Additive 2 | — | 0.50 | — | — | 0.20 | — | — |
|  | Additive 3 | — | — | 1.00 | — | — | — | — |
|  | Additive 4 | — | 0.05 | — | — | — | — | — |
| Stability Acid value (mgKOH/g) | refrigerant mixture A | 0.35 | 0.75 | 0.83 | 3.50 | 0.93 | 1.40 | 1.80 |
|  | refrigerant mixture B | 0.01 | 0.05 | 0.08 | 1.53 | 0.15 | 0.14 | 0.80 |
|  | refrigerant mixture C | 0.21 | 0.33 | 0.58 | 4.50 | 0.76 | 1.03 | 2.22 |

In addition, the refrigerant compatibility test described below was conducted on the sample oils 1 to 5, and it was confirmed that all of the sample oils were compatible with the refrigerants.

(Refrigerant Compatibility Test)

An amount of 10 g of each sample oil was mixed with 10 g of each of the refrigerant mixtures A to C according to "Testing method for compatibility with refrigerants" specified in JIS-K 2211 "Refrigerating machine oils" to observe whether the refrigerant and the refrigerating machine oil were dissolved in each other at 0° C.

The invention claimed is:

1. A refrigerating machine oil consisting of a base oil and an additive;
   wherein the base oil consists of at least one ester of a fatty acid and a polyhydric alcohol, the ester having a carbon/oxygen molar ratio of 4.0 to 5.0, and the fatty acid comprises a branched fatty acid having 4 to 9 carbon atoms in a proportion of 50 to 100 mol %,
   wherein the additive consists of
      an acid scavenger, and
      at least one additive selected from the group consisting of an oxidation inhibitor, an extreme-pressure agent, an oily agent, an anti-foaming agent, a metal deactivator, an anti-wear agent, a viscosity index improver, a pour point depressant, and a detergent dispersant, and
   wherein the refrigerating machine oil is used with a trifluoroethylene refrigerant.

2. A working fluid composition for a refrigerating machine consisting of:
   a refrigerating machine oil according to claim 1; and
   a refrigerant comprising 20 mass % to 60 mass % of trifluoroethylene with respect to the total amount of the refrigerant.

3. A working fluid composition for a refrigerating machine according to claim 2,
   wherein the additive consists of at least one selected from the group consisting of an acid scavenger, an oxidation inhibitor, an anti-foaming agent, a metal deactivator, a viscosity index improver, a pour point depressant and a detergent dispersant; and
   the oxidation inhibitor consists of at least one selected from N,N'-diphenylphenylenediamine, p-octyldiphenylamine, p,p'-dioctyldiphenylamine, N-phenyl-1-naphthyamine, N-phenyl-2-naphthylamine, N-(p-dodecyl)phenyl-2-naphthylamine, di-1-naphthylamine, di-2-naphthylamine, N-alkylphenothiazine, 6-(t-butyl) phenol, 2,6-di-(t-butyl) phenol, (4-methyl-2,6-di-(t-butyl)phenol), and 4,4'-methylenebis(2,6-di-t-butylphenol).

4. A working fluid composition for a refrigerating machine comprising:
   a refrigerant comprising 20 mass % to 60 mass % of trifluoroethylene with respect to the total amount of the refrigerant, and
   a refrigerating machine oil comprising:
      an additive comprising an acid scavenger; and
      a base oil comprising an ester of a fatty acid and a polyhydric alcohol, the ester having a carbon/oxygen molar ratio of 4.0 to 5.0;
   wherein a content of the additive is 5 mass % or less with respect to the total amount of the refrigerating machine oil, and
   the fatty acid comprises a branched fatty acid having 4 to 9 carbon atoms in a proportion of 50 to 100 mol %.

5. A working fluid composition for a refrigerating machine according to claim 4,
   wherein the polyhydric alcohol comprises at least one selected from the group consisting of neopentyl glycol, trimethylolethane, trimethylolpropane, trimethylolbutane, di-(trimethylolpropane), tri-(trimethylolpropane), pentaerythritol, and dipentaerythritol; and
   the branched fatty acid comprises at least one selected from the group consisting of isobutanoic acid, 2-ethylhexanoic acid, and 3,5,5-trimethylhexanoic acid.

6. A working fluid composition for a refrigerating machine according to claim 5,
   wherein the fatty acid consists of at least one fatty acid selected from the group consisting of isobutanoic acid, 2-ethylhexanoic acid, and 3,5,5-trimethylhexanoic acid.

7. A working fluid composition for a refrigerating machine according to claim 5,
   wherein the refrigerant comprises:
      trifluoroethylene; and
      at least one refrigerant selected from the group consisting of difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), 1,1,1,3,3-pentafluorobutane (HFC-365mfc), 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf).

8. A working fluid composition for a refrigerating machine according to claim 7,
wherein the acid scavenger comprises at least one compound selected from the group consisting of a glycidyl ether epoxy compound, a glycidyl ester epoxy compound, an oxirane compound, an alkyloxirane compound, an alicyclic epoxy compound, an epoxidized fatty acid monoester, an epoxidized vegetable oil, a dialkylcarbodiimide, a diphenylcarbodiimide, and a bis(alkylphenyl)carbodiimide.

9. A working fluid composition for a refrigerating machine according to claim 7,
wherein the glycidyl ether epoxy compound comprises at least one compound selected from the group consisting of n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, and polyalkylene glycol diglycidyl ether,
the glycidyl ester epoxy compound comprises at least one compound selected from the group consisting of glycidyl benzoate, glycidyl neodecanoate, glycidyl-2,2-dimethyloctanoate, glycidyl acrylate, and glycidyl methacrylate,
the dialkylcarbodiimide comprises at least one compound selected from the group consisting of diisopropylcarbodiimide and dicyclohexylcarbodiimide, and
the bis(alkylphenyl)carbodiimide comprises at least one compound selected from the group consisting of ditolylcarbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide, and bis(nonylphenyl)carbodiimide.

10. A working fluid composition for a refrigerating machine according to claim 7,
wherein the acid scavenger comprises at least one compound selected from the group consisting of 2-ethylhexyl glycidyl ether, glycidyl neodecanoate, diisopropylcarbodiimide, and bis(diisopropylphenyl)carbodiimide.

11. A working fluid composition for a refrigerating machine according to claim 5,
wherein the refrigerant comprises trifluoroethylene and difluoromethane.

* * * * *